United States Patent [19]

Ryan

[11] Patent Number: 4,696,423

[45] Date of Patent: Sep. 29, 1987

[54] HIGH CAPACITY SHEAR FASTENER

[76] Inventor: John L. Ryan, 2814-27th West, Seattle, Wash. 98199

[21] Appl. No.: 837,010

[22] Filed: Mar. 5, 1986

Related U.S. Application Data

[63] Continuation-in-part of Ser. No. 567,274, Dec. 30, 1983, abandoned.

[51] Int. Cl.⁴ .................. B21J 15/04; B21J 15/10
[52] U.S. Cl. ........................ 227/55; 411/21; 411/479; 227/156
[58] Field of Search .............. 227/55, 156; 29/275; 411/21, 74, 61, 181, 479

[56] References Cited

U.S. PATENT DOCUMENTS

| | | | |
|---|---|---|---|
| 1,304,887 | 5/1919 | Kennedy | 411/61 |
| 2,823,572 | 2/1958 | Gisondi | 411/74 |
| 3,093,178 | 6/1963 | Boyd | 411/181 |
| 3,269,251 | 8/1966 | Bass | 411/21 |
| 3,417,525 | 2/1968 | Dashio | 411/74 |
| 4,354,782 | 10/1982 | Newport | 411/479 |

FOREIGN PATENT DOCUMENTS 701524  2/1966  Italy ................. 411/61

*Primary Examiner*—Paul A. Bell
*Attorney, Agent, or Firm*—Graybeal, Jensen & Puntigam

[57] ABSTRACT

A hollow sheet metal steel fastener for joining wood and/or wood product assemblies subjected to high shear and bending stress loadings. The fastener comprises an elongated, equilateral triangular tubular shaft with continuous stiffening ribs along the centerlines of the three sides to effect and approximate a six pointed star form when viewed in cross section providing a uniquely rigid shaft to withstand lateral shear forces across the transverse section and longitudinal bending stresses. The fastener further comprises three integral, uniquely formed flanges at opposite ends of the shaft with three driving head flanges at one end so formed as to mate with a specially designed driving tool to enable mechanically powered driving, said tool having a rounded, concave driving head as required to resistance drive the fastener into a lesser diameter lead hole in the host materials. The lead point flanges, opposite end, are multi-function and multi-mode for optional, alternative fastener applications, consisting of three V-formed flanges symmetrically formed about the longitudinal shaft centerline to permit initial insertion into the prebored lead hole in the host materials for power driving placement and then, subsequent displacement of the lead point flanges, after driving, in variable configurations to meet variable installed modes.

7 Claims, 10 Drawing Figures

HIGH CAPACITY SHEAR FASTENER

This application is a continuation-in-part of U.S. patent application Ser. No. 567,274, now abandoned, filed Dec. 30, 1983.

TECHNICAL FIELD

This invention relates to a mechanically, power driven, tubular steel fastener with a shaft which is basically triangular in cross-section and designed as a "wood critical" structural wood fastener to transfer high lateral shear stress loads with respect to both the longitudinal and transverse axes of the fastener.

More particularly, the fastener used in conjunction with a specifically designed driving tool transfers the impact stresses during the driving process and transfers these stresses to the shaft sides to preclude mushrooming deformation of the head and shaft. The lead end flanges are specifically formed for driving the fastener into a lesser diameter prebored lead hole and for post driven outward deflection and partial embdement into the walls of the lead hole or alternatively, for optional deflection beyond the plane of the shaft sides to form a double headed fastener.

BACKGROUND ART

High volume construction techniques requiring prefabrication of wood building frames or framing components such as trusses, joists, beams, plywood diagrams and the like has necessitated the search for improved fastening means. Except for glue lamination of structural beams and girders, the joining of lumber and wood products has been largely limited to nails and staples inserted by hand or mechanical impact means. Using large quantities of low capacity fasteners to transfer large stress loads has proven to be generally impracticable both in terms of time and failure to attain the desired result.

Screws afford small advantage over nails or staples having a small effective diameter shank and are thus normally used as anchors against withdrawal.

Spikes, lagscrews and bolts are normally employed to connect timber beams, girders and trusses etc. These devices afford higher allowable design loads in lateral shear but due to their size, weight and use limitations are often of little benefit for commercial joining of lumber or wood product assemblies.

Recent fastener inventions have included surface applied plate or framing anchor connectors that are generally used in lower structural design load capacities.

Disclosures of fasteners found during a preliminary patentability search conducted during October 1981 and cited by the Examiner during the prosecution of the parent case are listed hereinafter and have been reviewed and evaluated for anticipatory purposes.

These references included U.S. Pat. No. 141,810 granted to Nichols, Aug. 12, 1873, which discloses a nail fabricated from sheet metal which is grooved longitudinally to increase stiffness.

U.S. Pat. No. 266,511 granted to Perkins on Oct. 24, 1882 discloses a sheet metal nail wherein the folds in the final product are contiguous.

U.S. Pat. No. 273,385 granted to Perkins on Mar. 6, 1883 discloses a sheet metal nail fabricated of close proximity rolls or folds.

U.S. Pat. No. 624,758 granted to Curtin on May 9, 1899 discloses a hollow plug or wedge for securing flashings to buildings but is not designed for and has no structural integrity.

U.S. Pat. No. 723,452 granted to Estes on Mar. 24, 1903 discloses a hollow spike member having longitudinal cuts allowing the side portions to flare outwardly during the driving process to reduce the changes of withdrawal.

U.S. Pat. No. 1,108,483 granted to Abramson Aug. 25, 1914 discloses a hollow spike member having longitudinal cuts allowing the side portions to flare outwardly during the driving process to reduce the chances of withdrawal.

U.S. Pat. No. 1,344,596 granted to Shaefer on June 22, 1920 discloses a break pin or rivet type device for securing adjacent plates and serving as a pivot pin.

U.S. Pat. No. 1,165,778 granted to Howard Dec. 28, 1915 discloses a railroad spike wherein the spike is fabricated of telescopically received portions such that the points of the spike will flare upon final set to impede withdrwal.

U.S. Pat. No. 1,304,887 granted to Kennedy May 27, 1919 discloses nothing more than an expansion shield or bolt anchor.

U.S. Pat. No. 2,321,101 granted to Openshaw on June 8, 1943 discloses a dowel pin which is adapted to be driven into adjoining wood members and flare outwardly.

U.S. Pat. No. 2,404,928 granted to Schutten July 30, 1946 discloses a nail and sleeve combination which serves essentially to form an anti-withdrawal device.

U.S. Pat. No. 2,543,212 granted to Waara Feb. 27, 1951 discloses a tubular headed fastener including outwardly extending teeth to fixedly engage the host material.

U.S. Pat. No. 2,575,481 granted to Anderson Nov. 20, 1951 discloses a sleeve for securement of a wire fastener within a host material.

U.S. Pat. No. 2,812,526 granted to Porak et al Nov. 12, 1952 discloses a sheet metal nail which is essentially opne and thus would collapse under lateral stress.

U.S. Pat. No. 2,823,572 granted to Gisondi Feb. 18, 1958 discloses several species of hollow screw anchors.

U.S. Pat. No. 3,058,385 granted to Abrahamsen Oct. 16, 1962 discloses a channel shaped sheet metal nail which obviously will not withstand lateral stress.

U.S. Pat. No. 3,093,178 granted to Boyd on June 11, 1963 discloses a screw anchor.

U.S. Pat. No. 3,352,251 granted Aug. 30, 1966 to Bass discloses a screw anchor.

U.S. Pat. No. 3,352,191 granted Nov. 14, 1967 to Crawford discloses a dowel having outwardly flared barbs for securement in the host material.

U.S. Pat. No. 3,417,525 granted to Dashio Dec. 24, 1968 discloses hollow ground supports for building structures obviously a non-analogous art.

U.S. Pat. No. 3,710,672 granted to Hallock on Jan. 16, 1973 discloses a hollow sheet metal nail for use in an aggregate and includes outwardly flaring portions to hinder withdrawal.

U.S. Pat. No. 3,983,779 granted to Dimas Oct. 5, 1976 discloses a sheet metal roofing nail.

U.S. Pat. No. 4,031,802 granted to Hallock June 28, 1977 discloses a hollow sheet metal nail primarily designed for use with a lightweight base material.

U.S. Pat. No. 4,167,885 granted to Paskert et al Sept. 18, 1979 discloses a L or V shaped sheet metal nail which obviously would not withstand lateral sheet stress.

U.S. Pat. No. 4,354,782 granted to Newport Oct. 19, 1982 discloses a drive-in expansion fastener or screw anchor.

Italian Pat. No. 701524 granted Feb. 18, 1966 discloses a sheet metal expansion device for serving as a screw anchor.

U.S. Pat. No. 3,269,251 granted Aug. 30, 1966 to Bass discloses a threaded insert with anchor teeth to function as a nut.

DISCLOSURE OF THE INVENTION

The present invention, in contrast to the prior art known to the present inventor, pertains to a fastener for joining lumber, wood products or other materials having densities and characteristics similar to wood products into assemblies subject to high lateral shear stresses acting across the shaft (perpendicular to the longitudinal axis). The fastener further provides means to resist the forces causing rotation, withdrawal or pull-through all of which tend to part the members joined.

The fastener, comprising a hollow triangular shaft with lead extension flanges and driving head flanges at the opposite ends of the shaft, is power driven under compressive resistance into a prebored lead hole in the host members. The lead hole is of a lesser diameter than the effective diameter of the fastener and the placement is by means of conventional power hammers, riveters or presses utilizing an especially designed power drive adapter tool to mate with and drive the fastener as explained in greater detail hereinafter.

When power driven into the host members with the driving head flanges properly seated, a rod of a length greater than the fastener and of a diameter of the approximate inside diameter of the fastener's hollow shaft is inserted down the shaft core to impact the interior faces of the lead extension flanges and deflect them outwardly into coplanar alignment with shaft sides. The lead extension flanges are thus compressively interfaced with the surrouding host, and embedding the offset lead extension flange stiffeners into the wall of the prebore collectively extends the "effective" length of the shaft sides to transfer higher lateral shear loads, and, secondly, provides added resistance to rotation pull-through and withdrawal.

During manufacture, the fastener is progressively formed from a flat sheet metal blank with a width and length selected to develop the desired fastener shaft diameter and length. Three flange extensions are included at each end of the blanks length for progressive die formation of driving head flanges and lead extension flanges with the intervening body of the blank serving as the three shaft sides. Three continuous shaft stiffener ribs are integrally stamped longitudinally on center of the shaft sides to produce outward projecting ribs on the finished piece.

The three driving head flanges are formed thru approximately ninety-five degrees with offset flange stiffeners formed at the extreme flange corners which result in a slightly downturned (convex) driving head symmetrically arranged around the longitudinal axis of the fastener to mate with the round, concave face of the power driver adaptor tool flange.

The three lead extension flanges are formed flat as an extension of the shaft side at the shaft end and thence transitioning to a "U" form having their extreme corners offset for flange stiffening as for the stiffened head flanges opposite, and thence finally formed having their extreme ends deflected inward in juxtaposition symmetrically about the longitudinal shaft axis as required to permit their tips to be freely inserted into the prebored lead hole for initial compressive resistance driving of the fastener.

The longitudinal shaft portion of the blank is then formed into a basic equilateral triangle with the shaft corners and the three projecting longitudinal stiffening ribs at the centers of the shaft sides of a similar radius to effect a symmetrical six cornered or ribbed star form for the shaft cross-section.

With the above noted prior art in mind, one of the objects of the present invention is to develop a mechanically installed, power driven, lightweight, high strength lateral shear fastener to join lumber, plywood or wood product members or materials, offering advantageous design alternatives to the use of common nails, screws, staples etc.

Another object of the present invention is to develop a lateral shear fastener with exceptional shaft stiffness that could be classified as "wood critical", i.e., capable of failing, i.e., destroying, the host materials prior to fastener failure or yielding of the fastener on either longitudinal or transverse axes.

Still another object of the present invention is to develop a lateral shear fastener of sheet metal which could sustain power driven impact forces sufficient to drive the fastener into a lesser diameter prebore lead hole under substantial compressive resistance, and, in turn, preload or prestress the interfacing bond between the fastener and host to significantly reduce the "initial slip" factor when the assembly is subjected to lateral shear loads.

A further object of the present invention is to develop a lateral shear fastener with a shaft configuration possessing exceptional surface area contact with the host materials for a given diameter of fastener for maximum uniformity of omnidirectional stress transfer across the shaft.

Yet another object of the present invention is to develop a lateral shear fastener from sheet metal that could classify as a structural fastener for adoption by building codes, i.e, meeting short and long term loading, corrosion allowances, high unit stress design loads, etc.

Another object of the present invention is to develop a fastener that can be driven into a smaller diameter prebore lead hole under compressive resistance without undue distress to the host materials.

Still a further object of the present invention is to develop a lateral shear fastener that provides positive mechanical resistance to rotation, pull-through and withdrawal.

Another object of the present invention is to provide an especially designed power adaptor tool as required for power driving the fastener under compressive resistance while vectoring the impact forces inwardly toward and into the shaft sides, secondly, be adaptable to conventional power tools, and, thirdly, deflect the lead extension flanges outward to engage the wall of the prebore and extend the "effective" length of the shaft sides.

Still another object of the present invention is to develop a fastener with lead extension flanges of sufficient size, strength and configuration which when fully driven may optionally be deflected further beyond the plane of the shaft sides to any selected countersunk angle or to approximately normal to the shaft sides similar to the driving head flanges to effect a "double headed" fastener.

BRIEF DESCRIPTION OF THE DRAWINGS

FIG. 11 is a vertical section similar to FIG. 8 with optional lead extension flange positions indicated to effect the "double headed" installation mode.

BEST MODE FOR CARRYING OUT THE INVENTION

Figure 1:
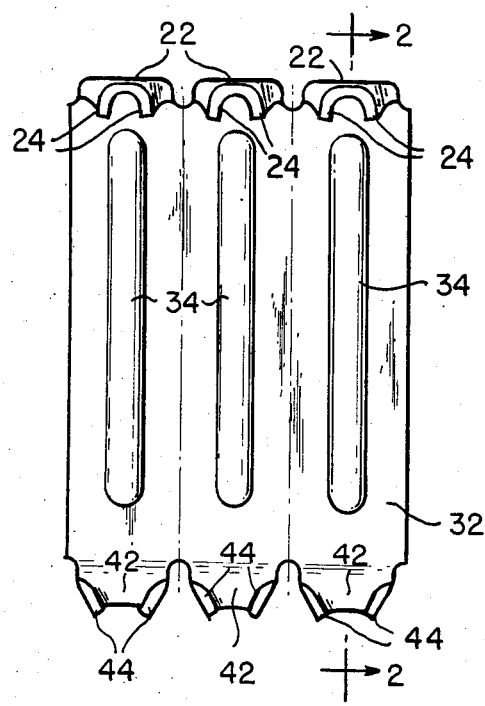
FIG. 1 is a view of a partially formed fastener depicting the driving head flanges, the lead extension flanges, and the stamped longitudinal stiffening ribs prior to progressive forming of the basic triangular shaft.

FIG. 1 depicts the fastener as a partially formed sheet metal blank with the three driving head flanges (22) and head flange stiffeners (24), the material for shaft sides (32) with integrally formed shaft stifferer ribs (34) and lead extension flanges (42) having lead flange stifferners (44).

Figure 2:
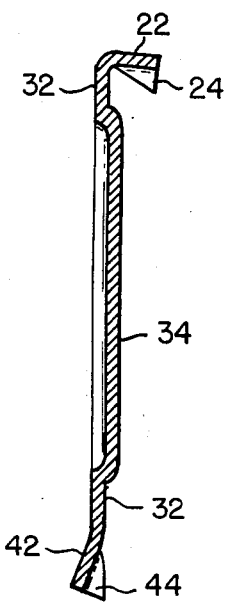
FIG. 2 is a sectional view along lines 2—2 of FIG. 1.

Referring now to FIG. 2 as seen along lines 2—2 of FIG. 1, the relative outward and slightly downwardly (convex) position of driving head flange (22) with offset flange stiffeners (24) and the lead extension flanges (42) with offset flange stiffeners (44) in relationship with the main basic shaft (32) and longitudinal stiffening ribs (34) may (most readily) be seen.

As explained hereinabove, the partially formed piece as seen in FIGS. 1 and 2 is then progressively formed along fold lines between and parallel to stiffener ribs (34) and forming a fastener with a basic shaft (32) in the form of an equilateral triangle as depicted in elevation, FIG. 3.

Figure 4:
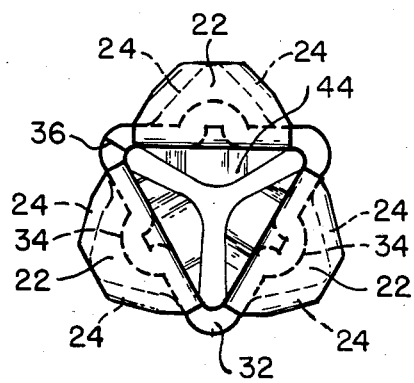
FIG. 4 is a top plan view of the fully formed fastener.
Figure 8:
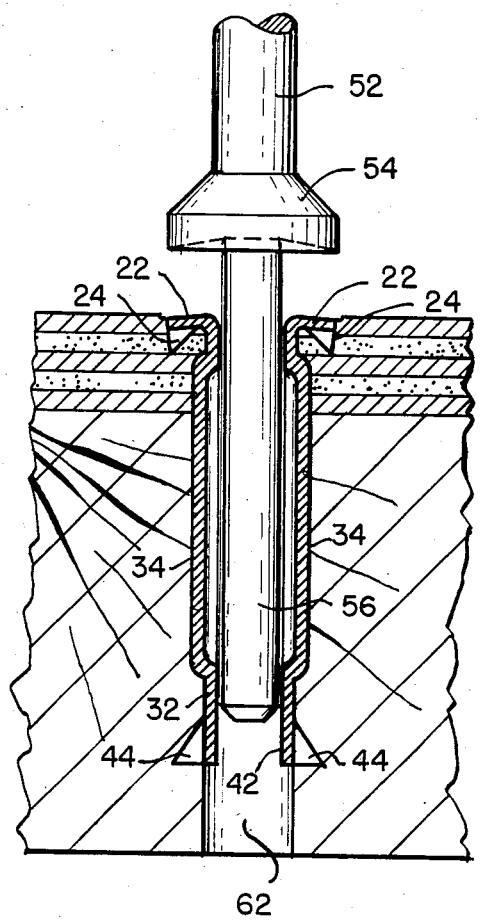
FIG. 8 is a vertical section through an installed fastener including the power driving adaptor tool, partially withdrawn.

As is most clear in FIG. 4 which is a top plan view of the driving head flanges (22) and offset head flange stiffeners (24) extending radially outward to provide a rigid surface area for power impact driving, and, additionally, serve as a stop drive point when the fastener is fully driven into the prebore (62) (see FIG. 8). The basic shaft sides (32) having free edges of the blank are shown as abutting at one corner of the basic shaft and having abuttment line 36.

Referring now the FIG. 5, which is a sectional view along lines 5—5 of FIG. 3, the basic shaft configuration may readily be seen, but, as further shown, the power driver adaptor shaft (56) which is sized for free insertion into the fasteners hollow core to serve for stability and prebore alignment during driving, and subsequently, using an extended or elongated adaptor shaft (56) to impact and deflect the led extension flanges outwardly.

Figure 3:
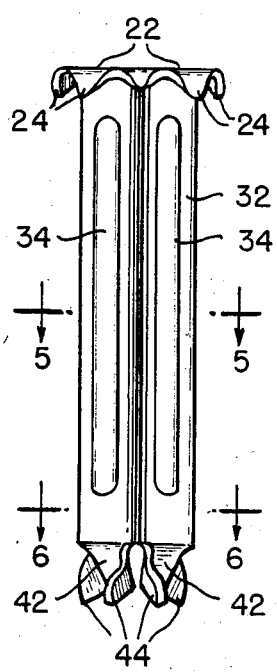
FIG. 3 is an elevational view of the fully formed fastener.
Figure 6:
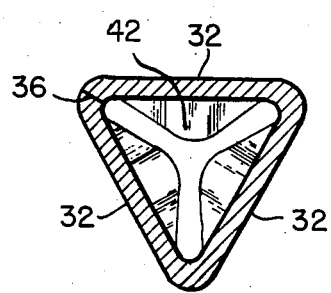
FIG. 6 is a sectional view along lines 6—6 of FIG. 3.

FIG. 6, taken along lines 6—6, FIG. 3, is used to show more clearly the relationship of the lead extension flanges (42) with respect to the shaft sides (32) and as depicted, the lead extension flanges and flange stiffeners (44) are formed to lie within the triangular shaft body (32) and the extreme portions of the flanges and stiffeners are freely inserted into the prebore lead hole (not shown) to augment initial resistance driving guidance.

Figure 7:
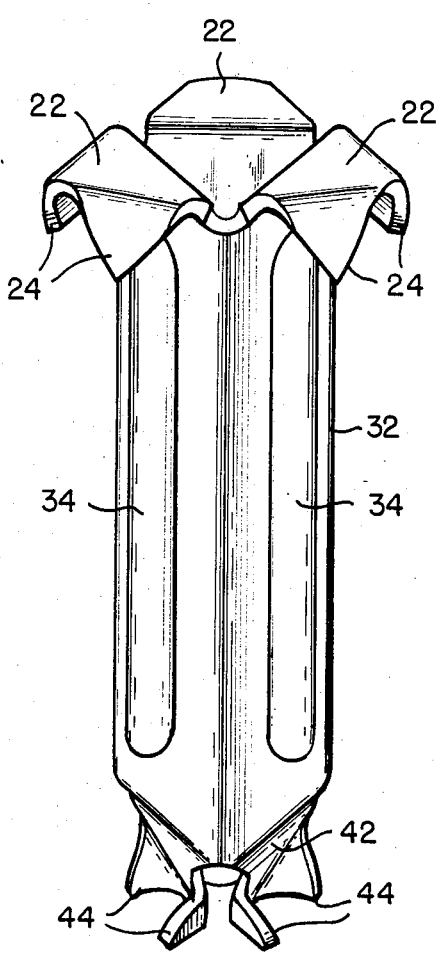
FIG. 7 is an isometric view of the fully formed fastener.

Referring to FIG. 7, an isometric view of the finished fastener, the relative positions and interrelationship of the various elements may be reaidly seen.

Referring to FIG. 8, which is a composite vertical cross-section (adapted through the shaft for clarity) through the fully driven fastener joining lumber and plywood with the driving head flanges (22) and head flange stiffeners (24) driven flush with the plywood surface and lead extension flanges (42) deflected outwardly into plane of the shaft sides (32) and lead extension flange stiffeners (444) embedded into the walls of the prebore lead hole (62) to effect positive mechanical resistance to rotation, withdrawal, or pull-through fores acting against the fastener. This configuration effectively extends or elongates the shaft length in compressive contact with the host to resist longitudinal rotation or "overturning" under critical lateral shear loads.

Figure 5:
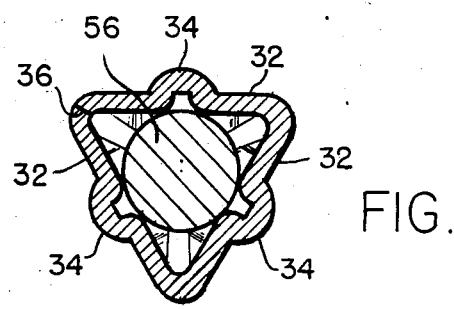
FIG. 5 is a sectional view along lines 5—5 of FIG. 3.

The prebored lead hole (62) is of lesser diameter than that which would circumscribe the basic shaft corners of the fastener, requiring power driving of the fastener under substantial compressional resistance and displacement of wood fibers at the wall of the prebore; the plasticity of wood or similar density materials altering the prebore hole to assume the configuration of the exterior shaft profile shown in FIG. 5 noted above.

The power driver adaptor shaft (56) mentioned above is shown as partially withdrawn from the shaft core after impacting and deflecting the lead extension flanges (42) outwardly in coplanar relation with the shaft sides (32). The power driver adaptor tool comprises a power driver adaptor shank (52) of various designs to mate with conventional power tools; a power driver adaptor flange (54) with a concave face to interface with the generally convex form of the driver head flanges (22) and stiffeners (24) to vector driving impact forces inward and into the shaft sides (32) to obviate "mushrooming" deformation of the fasteners head flanges (22) and shaft (32).

The driving adaptor shaft (56) is adjustable or elongated as required for stabilization and prebore alignment during power driving and subsequent impacting the inner faces of the lead extension flanges (42) to deflect them outwardly into the plane of the shaft sides (32).

Figure 9:
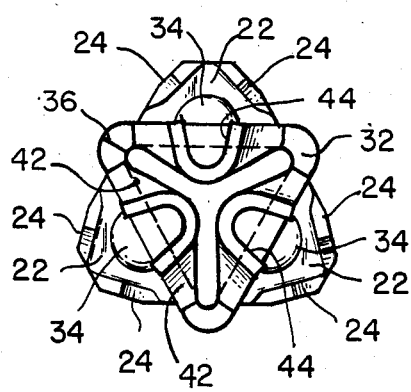
FIG. 9 is a plan view from the bottom of a fully formed fastener.
Figure 10:
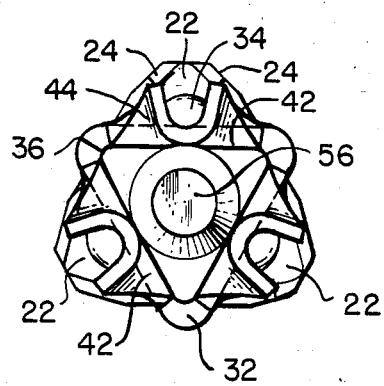
FIG. 10 is a view similar to FIG. 9, however, depicting the lead extension flanges deflected outward by the driving adaptor insert shaft in the fastener core.

FIGS. 9 and 10 are views from the leading end of the fastener and as seen in FIG. 9 the fastener is as manufactured and would be driven within a prebored hole of a radius approximately equal to the radius of the extreme outer surface of the shaft stiffener ribs (34) and shows the lead extension flanges (42) and lead flange stiffeners (44) in post-driven positions whereas FIG. 10 depicts the flanges (42) and stiffeners (44) after having been impacted and deflected radially outward by an extended driving adapter shaft (56) to effect coplanar alignment with the shaft sides (32) and to extend the effective shaft length compressive interfacing with the wall of the prebore lead hoel (62).

FIG. 11, similar to FIG. 8, depicts a fully installed fastener in the double headed mode with the lead extension flanges (42) and stiffeners (44) deflected optionally through a range of approximately ninety degrees beyond the plane of the shaft sides and wall of the prebore lead hole transforming the lead extension flanges to another head, similar and opposite to the driving head flanges. The option for deflecting the lead extension flanges to various intermediate angles of countersinking (not shown) is open to selection.

Thus as can be seen, the present invention provides at a minimal cost for material and relative ease of fabrication a fastener which is adapted to be force driven using a particularly designed driving tool into a plastic host material resulting in a fastener with unprecedented shear resistance and security. The particular configuration of the shaft sidewalls including the reinforcing and surface contacting ribs in conjunction with the lead and head end flanges and their integral strengthening elements result in this superior fastener.

I claim:

1. A tool for joining together wood or wood product assemblies designed to be subjected to high shear and bending stress loadings, said tool being adapted to drive a fastener into a prebored lead hole in the assemblies, the fastener being of the type comprising a hollow shaft core of predetermined dimensions formed by a plurality of shaft sides with a plurality of driving head flanges at one end of the hollow shaft core, said tool comprising:
- an adapter shank for mating with and transmitting driving force from a mechanical power source;
- a circular driving flange attached to said shank, said flange having a generally concave driving face adapted to mate with the fastener driving head flanges and designed to vector the driving force from the mechanical power source inwardly toward the hollow shaft core and into the shaft sides;
- an elongated, round, rigid rod attached to said shank and said circular driving flange, said rod being adapted to be inserted into the hollow shaft core with a light friction fit;
- whereby a desired alignment of the prebored lead hole, the fastener, the tool and the mechanical power source can be maintained prior to and during driving of the fastener into the assemblies under severe mechanical impacting and compressive resistance while preventing both longitudinal and transverse deformation of the fastener and while maintaining design integrity of the fastener.

2. A tubular fastener having:
- a shaft with a symmetrical cross-section in the configuration of an equilateral triangle,
- a longitudinal outwardly projecting rib extending substantially the length of each side of the shaft,
- integral lead end flanges at the first end of the shaft, said lead end flanges being extensions of the sides and formed inwardly such that the outermost ends lie within the circumference of a circle circumscribing the shaft,
- integral following end flanges at the second end of the shaft, said following end flanges being integral with the sides and flared outwardly such that they extend outside the circumference of a circle circumscribing the shaft.

3. A tubular fastener as in claim 2 wherein the lead end flanges are integral with the shaft and are in the form of a V flared outwardly and located totally within the circumference of a circle circumscribing the shaft.

4. A tubular fastener as in claim 2 wherein the following end flanges are each formed such that the uppermost surface extends in a forward direction as the surface extends outwardly from the longitudinal axis of the fastener.

5. A tubular fastener as in claim 4 wherein the shape of the following end flanges is engineered to mate with a driving element with a concave head to mate with the flanges and a forwardly projecting shaft which is inserted within the shaft such that the driving forces are vectored into the fastener sides.

6. Fastener means for maximum resistance to lateral shear forces adapted to be forced into a prebored hole of lesser diameter than the shaft of the fastener comprising:
- a hollow, closed continuous main shaft portion of a stiffness to withstand a forced insert having a cross-section substantially that of an equilateral triangle, and including a longitudinal ridge extending substantially the length of each face of the shaft portion,
- an integral driving flange extending radially outwardly at the following end of the fastener, said driving flange comprisng outwardly and forwardly extending continuations of each face whereby said flange cooperatively mates with a concave driving flange of a driving tool,
- integral leading edge flanges extending radially inwardly from each face whereby when driven outwardly they engage the host material and effectively extend the shaft length when used in conjunction with a prebored hole of a diameter less than the circumscribing diameter for the shaft,
- a driving tool including a shaft for insertion within the hollow shaft of the fastener and a concave head to direct the forces inwardly, said tool facilitating mechanical driving into the host material increasing the surface contact with the host material the lateral shear force resistance capacity.

7. An integrally formed, folded steel tubular fastener having a rigid, uniform and symmetrical shaft having a cross-section basically in the configuration of an equilateral triangle, and having
- a continuous, stiffener rib extending substantially the length and on centerline of each of the three shaft sides,
- lead end flanges at the first end of the shaft formed symmetrically inwardly such that the extreme flange ends are approximately in contact about the longitudinal shaft axis,
- following'end flanges at the second end of the shaft formed outwardly with a compound curvature to the upper surface in a substantially 'convex' form as required to mate with and sustain the power driving impact forces transmitted by a substantially 'concave' driving flange.

* * * * *